United States Patent [19]

Aiello et al.

[11] Patent Number: 6,124,776
[45] Date of Patent: Sep. 26, 2000

[54] METHOD FOR IMPROVED AUDIBLE NOISE FOR SPINDLE MOTOR

[75] Inventors: Anthony Joseph Aiello, Santa Cruz; Alan Lyndon Grantz, Aptos, both of Calif.

[73] Assignee: Seagate Technology LLC, Scotts Valley, Calif.

[21] Appl. No.: 09/158,641

[22] Filed: Sep. 22, 1998

Related U.S. Application Data

[60] Provisional application No. 60/059,441, Sep. 22, 1997, provisional application No. 60/063,220, Oct. 23, 1997, and provisional application No. 60/061,680, Oct. 10, 1997.

[51] Int. Cl.$^7$ ............................................. H01F 13/00
[52] U.S. Cl. ................................. 335/284; 310/51
[58] Field of Search .................. 310/51, 42, 45, 310/152–6; 335/284; 361/143, 152, 153, 156; 29/596, 598, 605, 606

[56] References Cited

U.S. PATENT DOCUMENTS

| | | | |
|---|---|---|---|
| 4,874,712 | 10/1989 | Crapo | ..................................... 360/99.08 |
| 4,949,000 | 8/1990 | Petersen | ................................. 310/67 R |
| 5,093,595 | 3/1992 | Korbel | ..................................... 310/156 |
| 5,874,796 | 2/1999 | Petersen | ................................. 310/156 |
| 5,907,453 | 5/1999 | Wood et al. | ............................. 360/107 |

*Primary Examiner*—Lincoln Donovan
*Attorney, Agent, or Firm*—Flehr Hohbach Test Albritton & Herbert LLP

[57] ABSTRACT

A method is disclosed for shaping the magnetization wave form or flux which is established by a magnetizer which magnetizes the magnet to be used in a motor. The magnetizer includes a steel core having a plurality of axially directed conductors; the annular magnet surrounds the core. A similarly shaped annular backiron surrounds the magnet; the backiron is separated from the magnet by an airgap of a fixed width. The gap is also referred to herein as an "airgap." However, airgap material need not be limited to air. Other materials (e.g., plastic) with similar magnetic permeability to that of air would work equally well. Introducing an airgap between the magnet outer diameter and the steel flux return path backiron results in widening the magnet flux pole-to-pole transition zone, increasing the flux transition angle, reducing torque ripple without serious negative impact on $K_e$ and torque.

9 Claims, 12 Drawing Sheets

Magnetizer Airgap Backiron Cross-Section

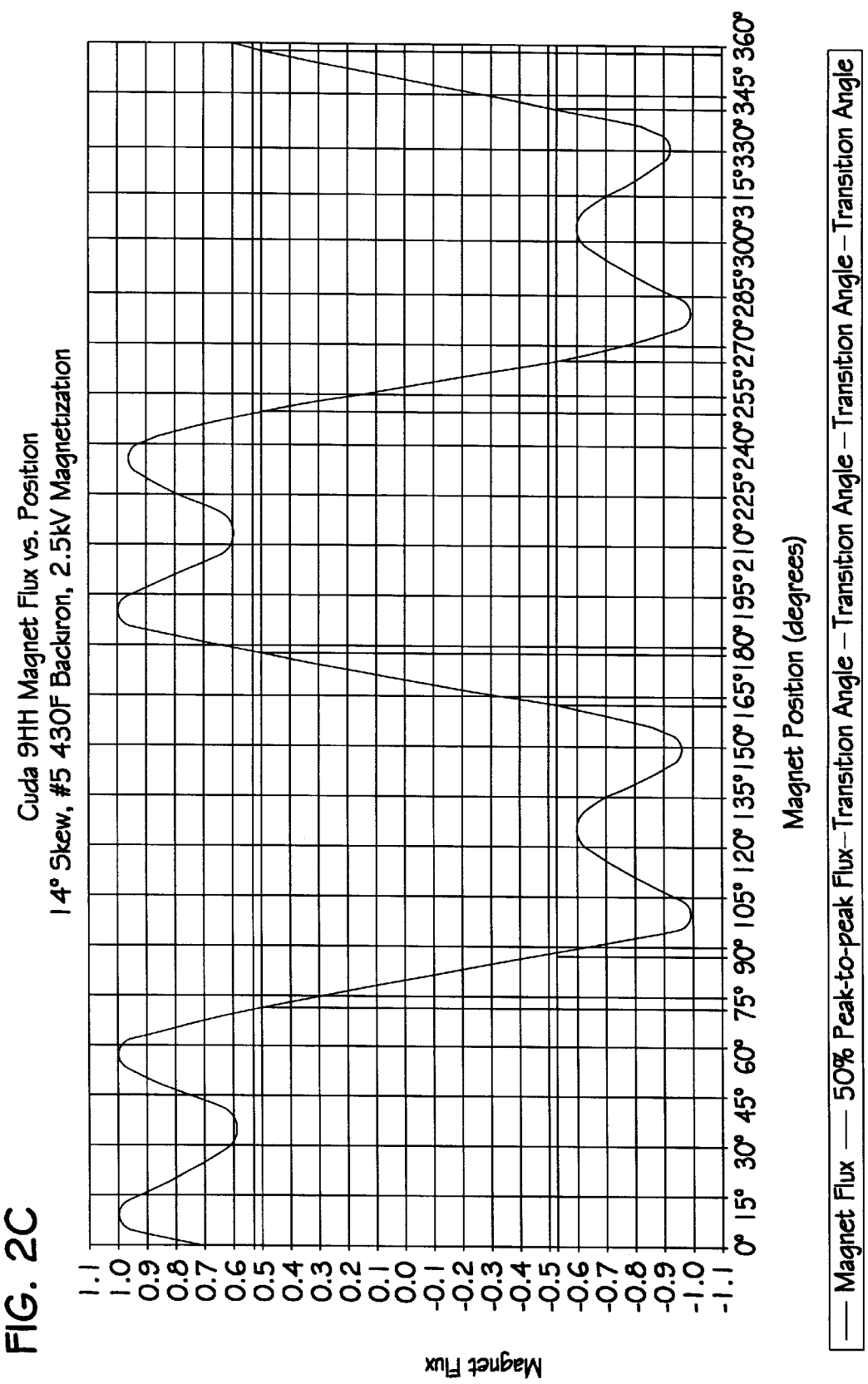

Magnetizer Airgap Backiron Cross-Section

| | Relative Performance of 5 Magnets[3] | | | | Flux Return Path Backiron Steel ID (mm) | Ke Tolerance Needed to Pass Torque Specs. (mV-s/rad)[4] |
|---|---|---|---|---|---|---|
| | Ke (mV-s/rad) | Start Torque (oz-in) | Torque Ripple (oz-in) | Average Flux Transition Angle[1] | | |
| 14° Skew, Full Backiron[2] (0% Airgap - control) | 12.21 (100%) | 3.25 (100%) | 0.70 (100%) | 12.73° | 20.42 | |
| 14° Skew, 33% Airgap Backiron (#4) | 11.66 (95.5%) | 3.17 (97.5%) | 0.62 (88.6%) | 13.65° | 27.94 | 11.04±1.63% |
| 14° Skew, 44% Airgap Backiron (#4.5) | — | — | — | — | 30.48 | 10.81±1.94% |
| 14° Skew, 56% Airgap Backiron (#5) | 11.42 (93.5%) | 3.11 (95.7%) | 0.58 (82.9%) | 14.55° | 33.02 | 10.75±2.51% |
| 14° Skew, 67% Airgap Backiron (#5.5) | — | — | — | — | 35.56 | 10.90±3.67% |
| 14° Skew, 78% Airgap Backiron (#6) | 11.23 (92.0%) | 3.08 (94.8%) | 0.56 (80.0%) | 15.00° | 38.10 | 10.96±4.01% |
| 14° Skew, No Backiron[2] (100% Airgap) | 11.10 (91.0%) | 3.02 (92.9%) | 0.54 (77.1%) | 15.30° | infinite (all air) | |

[1] Angle centered within 50% of peak-to-peak flux
[2] Design considered to be prior art
[3] All five magnets: 14° skew, 2.5 kV/37.8 kA magnetization
[4] Data from Tech file reports #3357 (6/16/97) & #3359 (7/7/97)

FIG. 5

METHOD FOR IMPROVED AUDIBLE NOISE FOR SPINDLE MOTOR

CROSS-REFERENCE TO RELATED APPLICATIONS

This application is based on U.S. Provisional Patent Application Ser. No. 60/059,441, filed Sep. 22, 1997, U.S. Provisional Patent Application Ser. No. 60/063,220, filed Oct. 23, 1997, and U.S. Provisional Patent Application Ser. No. 60/061,680, filed Oct. 10, 1997.

FIELD OF THE INVENTION

This invention relates generally to a brushless DC motor especially designed for driving a rotating hard disc in a hard disc drive.

BACKGROUND OF THE INVENTION

In permanent magnet motors, interfering or parasitic torques may develop because of the interaction between the edges of the magnetized poles and the slots of the stator. In small size motors, such as are used in disc drives, these problems can be significant. The radial thinness of the rotor magnet is required by the limited diameter of the motor itself. In such a small, high power motor, the air gap between the facing surfaces of the stator and rotor must also be minimized. The combination of high induction, the slotted stator, the minimal air gap, and the thinness of all the elements can easily lead to so-called torque unevenness or torque ripple.

The resulting running torque ripple in the motor is a source of audible noise. Since the disc drive is used in computers, such audible noise must be reduced in order for the product to be commercially successful.

It has been recognized that the reduction of torque ripple is an important goal. One current method known of reducing torque ripple is designing the spindle motor to have a trapezoidal back EMF (BEMF) wave form. Current methods used to achieve such trapezoidal BEMF include weak magnetization of the magnet pole center, or selection of stator slot/number/magnetic pole member. For example, it is disclosed in European patent 291,219, U.S. Pat. No. 4,847,712 Issued Jul. 11, 1989, that the number of stator poles should be kept approximately the same as the number of rotor poles. This is also taught to reduce torque fluctuations during starting or idling. However, in general according to the reference, this method requires at least nine wound coils per motor.

A problem with this approach is that in most known spindle motor configurations, other design considerations dictate the number of poles and slots to be used and the numbers are usually different. The selection of the number and arrangement of the poles and slots in most disc drive spindle motors is dictated by other considerations than the shape of the back EMF wave form.

Another approach has been to reduce the magnetic skew angle between adjacent poles. Reducing skew angle does reduce acoustic prominent tone amplitudes. However, this also causes a significant increase in torque ripple and cogging torque.

Thus, the problem remains of providing a magnet for use in a motor which minimizes the motor's running torque ripple while remaining consistent with other design considerations for an efficiently operating disc drive spindle motor.

SUMMARY OF THE INVENTION

Therefore it is a primary general objective of the present invention to provide a permanent magnet excited motor having reduced running torque ripple in order to diminish the audible noise and vibration generated by or associated with the motor.

It is a further objective of the invention to provide a method for magnetizing a motor magnet, especially for use as a spindle motor in a disc drive which provides reduced running torque ripple while remaining consistent with other design objectives of a disc drive spindle motor.

A further objective of the invention is to provide reduced running torque ripple by shaping and measuring the magnetization of the motor magnet once the magnet is magnetized.

These and other objectives of the present invention are achieved by shaping magnetization wave form or flux which is established by a magnetizer which magnetizes the magnet to be used in a motor. The magnetizer includes a steel core having a plurality of axially directed conductors; the annular magnet surrounds the core. A similarly shaped annular backiron surrounds the magnet; contrary to the practice of the prior art, the backiron is separated from the magnet by a gap of a fixed width. The gap is also referred to herein as an "airgap." However, airgap material need not be limited to air. Other materials (e.g., plastic) with similar magnetic permeability to that of air would work equally well.

An airgap was introduced between the magnet outer diameter and the steel magnetizer flux return path backiron.

Introducing an airgap between the magnet outer diameter and the steel flux return path backiron results in widening the magnet flux pole-to-pole transition zone, increasing the flux transition angle. The transition zone between magnet poles is defined as the delineating region in which the magnet flux is oriented tangentially rather than radially.

An airgap between the magnet outer diameter and the steel backiron weakens the magnetization flux attraction to the steel return path backiron. The flux at the transition zone then tends to form a more circular return path, which widens the region in which the flux orientation is tangential (widens the transition zone). The closer the steel backiron is to the magnet outer diameter, the stronger the flux attraction to the steel. This strong attraction to the steel backiron aligns the flux more radially in the transition zone, forcing it into a sharply elliptical return path and consequently narrowing the transition zone.

Other details and advantages of the present invention will become apparent to a person of skill in this field who studies the following figures in conjunction with the description of a preferred embodiment or embodiments.

BRIEF DESCRIPTION OF THE DRAWINGS

FIGS. 2A–2E are graphs of magnet flux versus position for a series of motor magnets magnetized using differing airgap width combination;

FIG. 5 is a Table illustrating the relative performance of multiple magnets magnetized with different backiron air:steel ratios;

DETAILED DESCRIPTION OF THE PREFERRED EMBODIMENT

Figure 1:
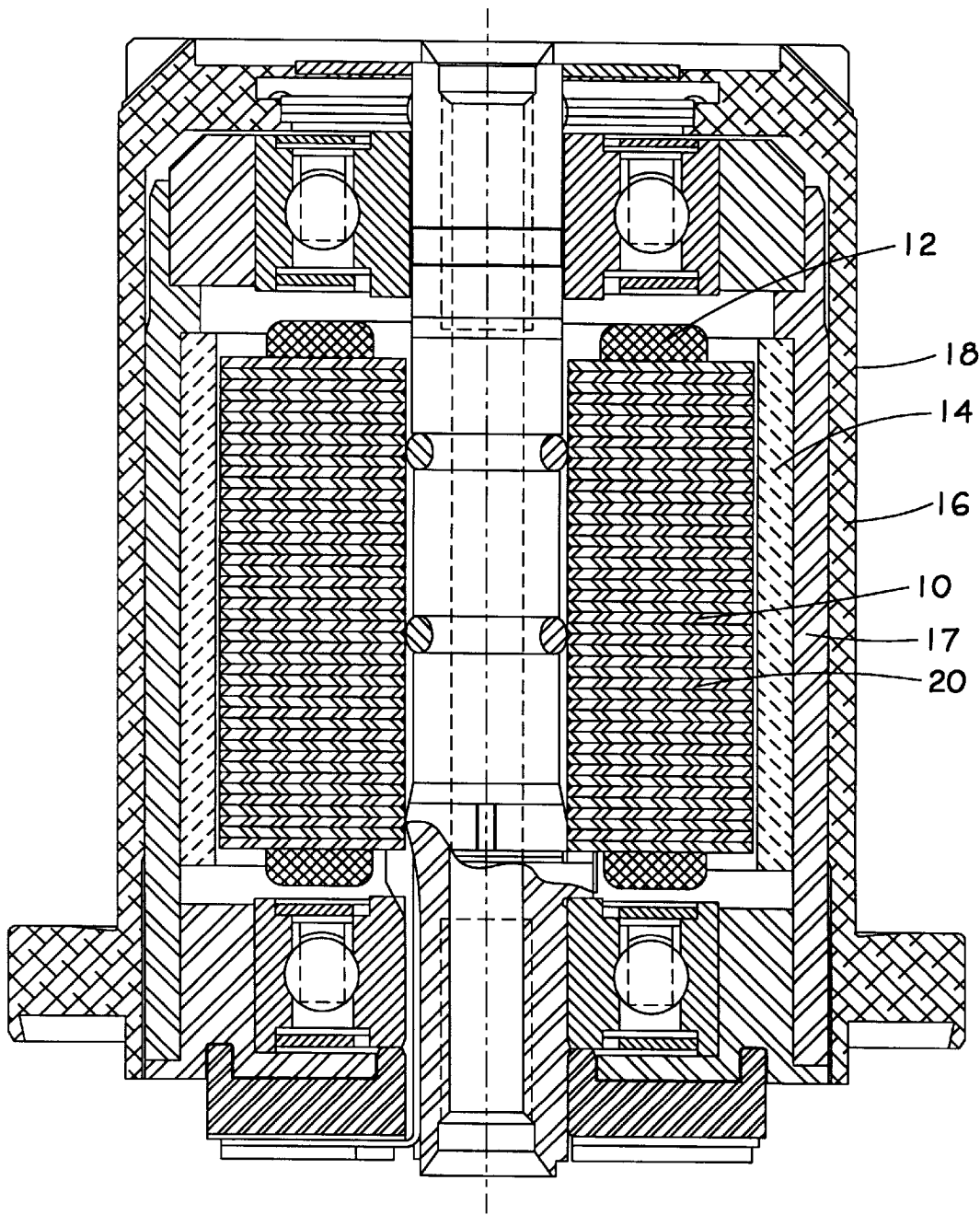
FIG. 1 is a vertical sectional view of a typical motor in which a magnet made according to the present invention may be used.

FIG. 1 is a vertical sectional view of a typical motor with which any of the embodiments of the present invention could be used with a reduction in running torque ripple of the motor. The many details of the motor of course are not significant to the present invention but it is sufficient to note that it is a typical three phase motor of a type well known in the disc drive field, having a stator 10 supporting coils 12, interacting with a magnet 14 which is supported on the interior surface of an external hub 16 and backiron 17. A disc or discs are supported on the exterior surface 18 of the motor for rotation at constant speed. A finite gap 20 is defined between the stator and the motor i.e., bordered by the stator 10 on one side and the permanent magnets 14 on the opposite side.

The magnets 14 in such a motor are cylindrical in shape and comprise alternating north/south poles, with a transition region between each of the poles. For reasons explained above and already well known in this field, such a design is a well known source of running torque ripple because of the effects of the interaction between the magnetic poles and the stator as the transition edges of the magnetic poles pass the gaps in the stator.

Figure 2A:
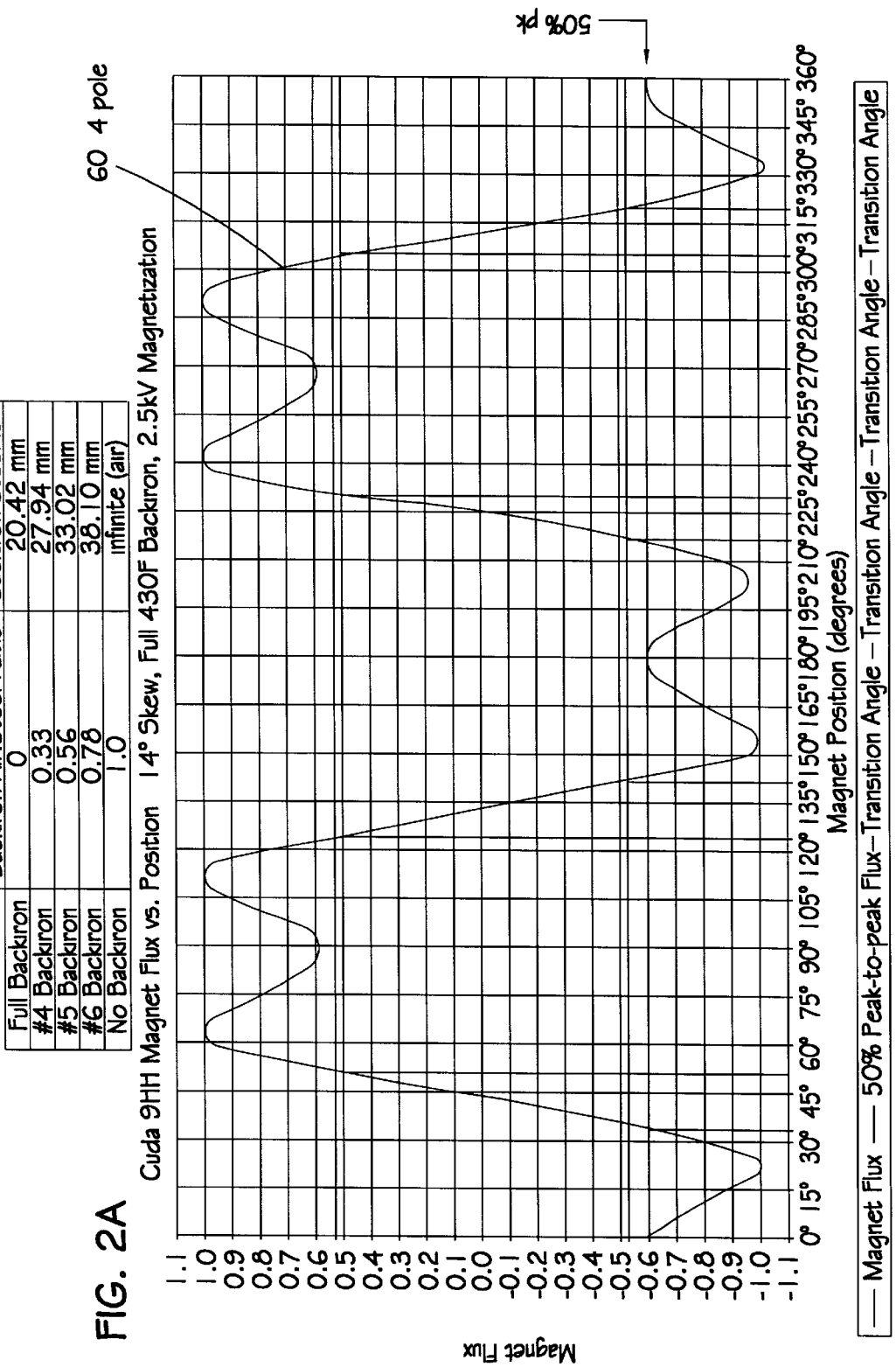
Figure 2B:
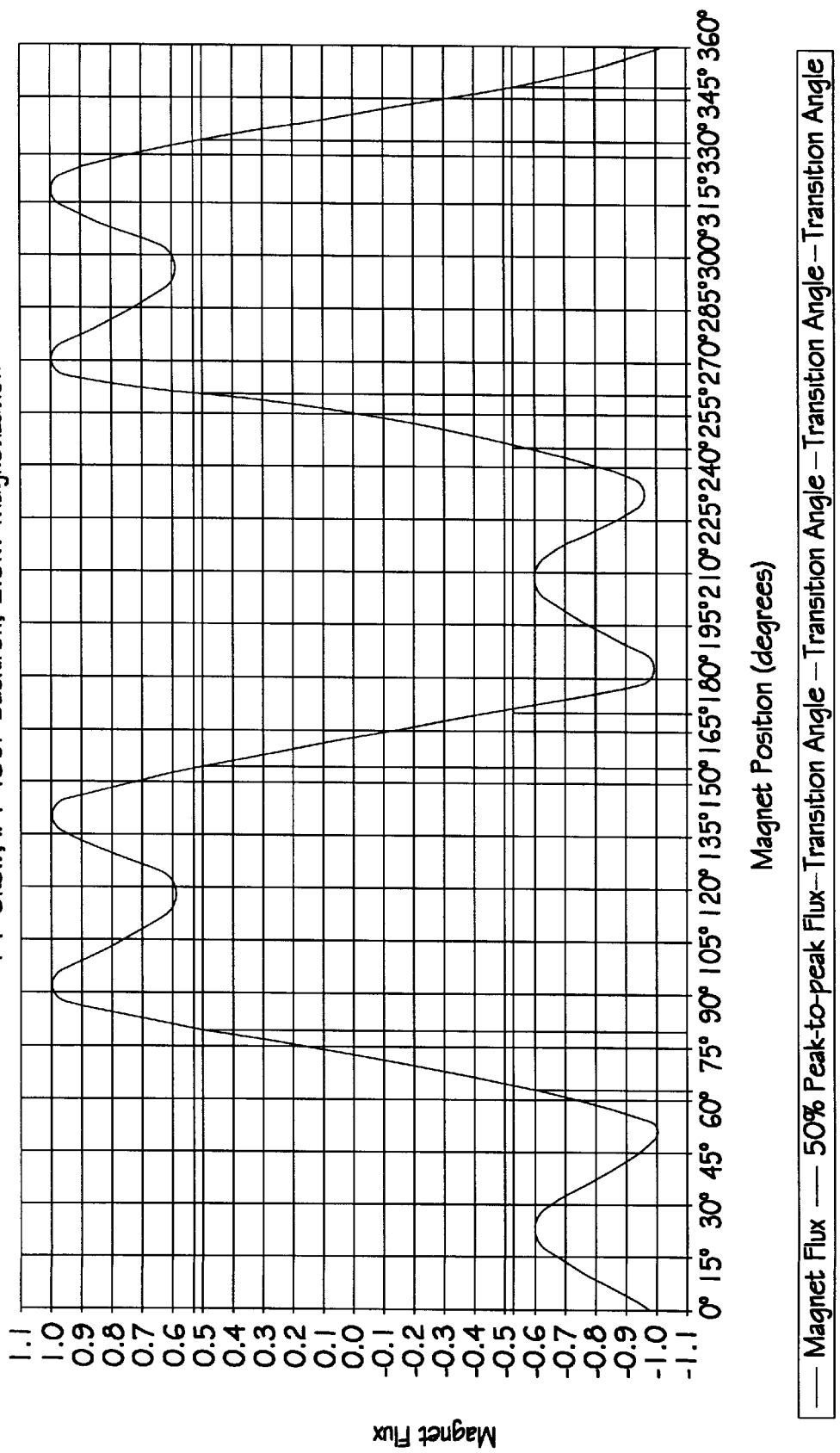
Figure 2D:
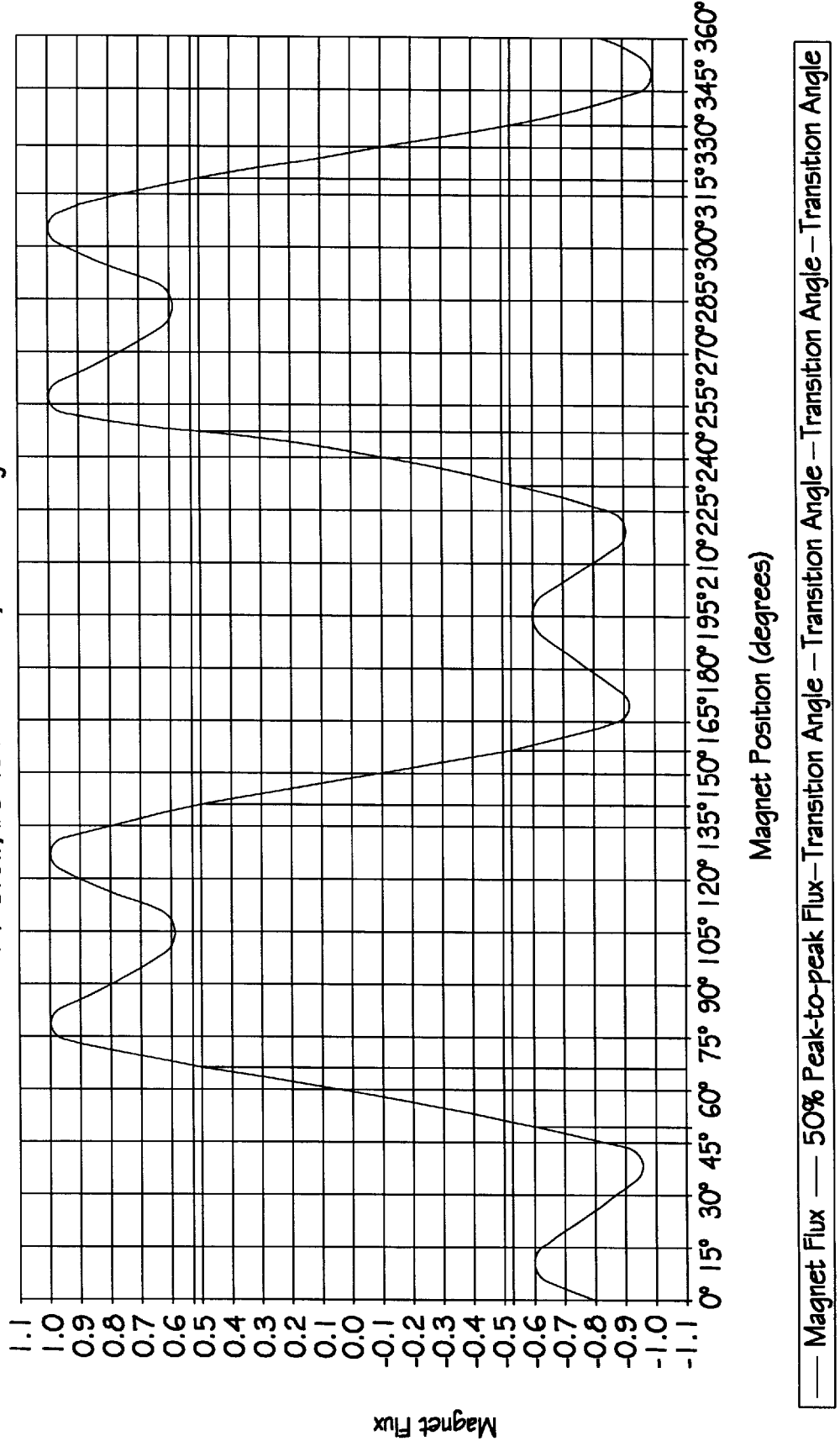
Figure 2E:
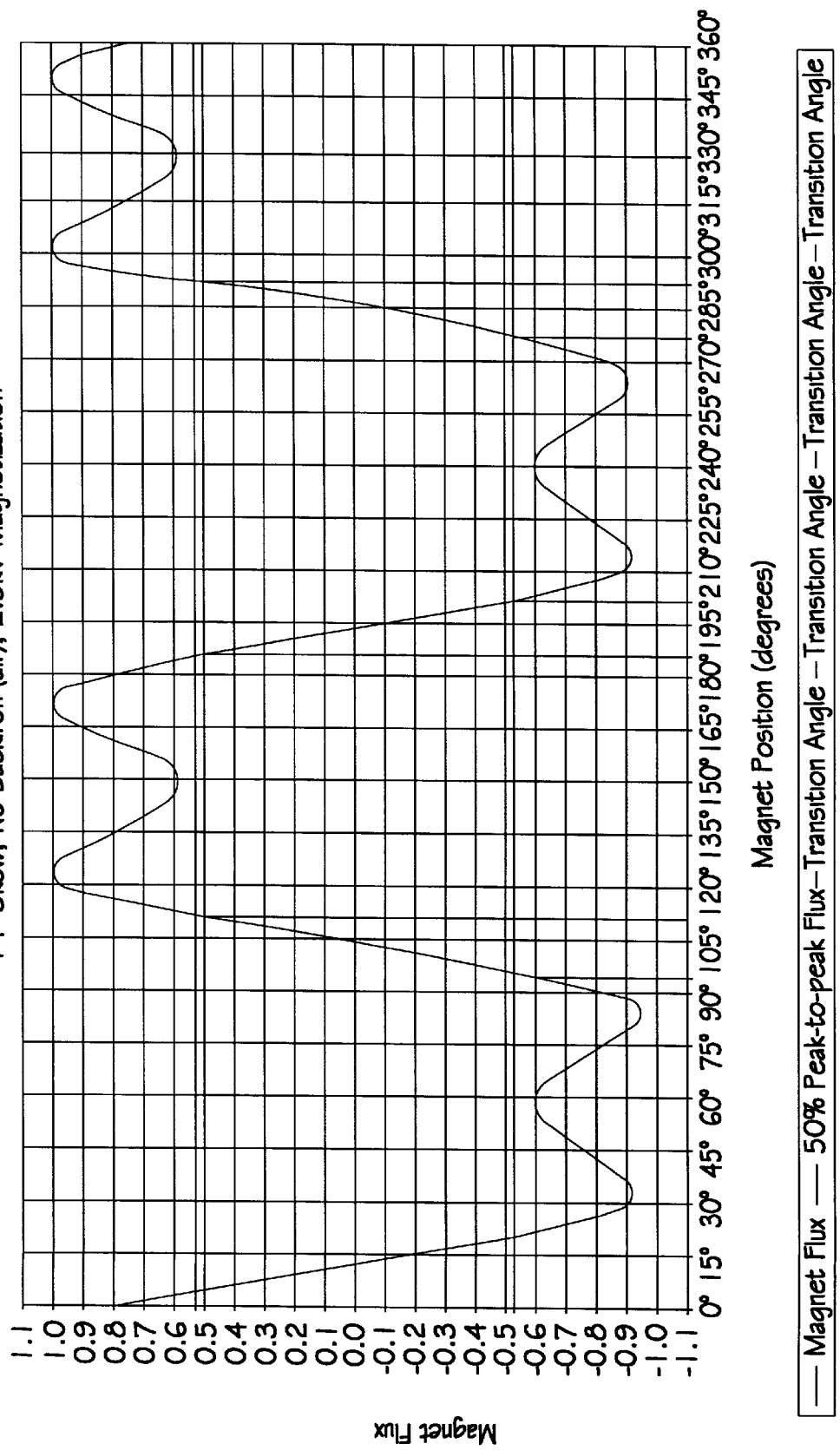
Figure 3A:
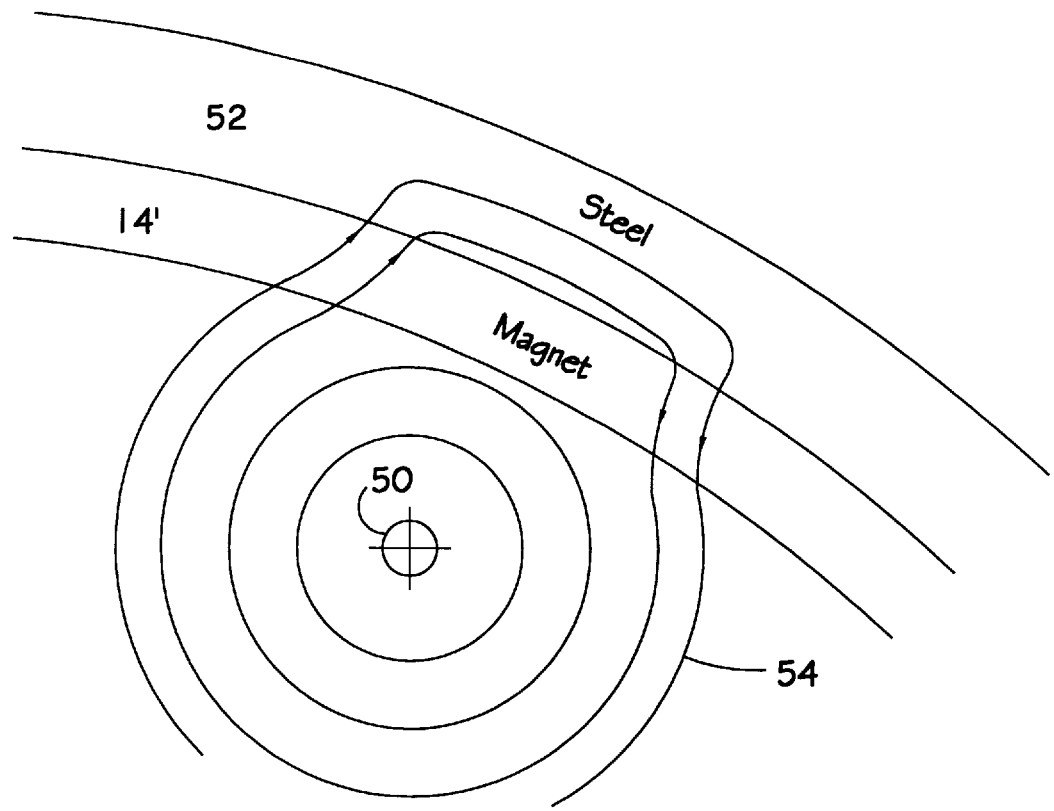
FIG. 3A illustrates a prior art magnetizer without airgap.

The objectives of the present invention of improving motor vibration and acoustics and reducing torque ripple can be appreciated by reference to FIG. 2A which is one of a set of flux versus position plots for a magnet magnetized in a magnetizer as shown in partial section in FIG. 3A. Such a magnetizer includes a plurality of current carrying wires (only one of which is shown in FIG. 3A) which when energized create lines of flux which extend through the magnet 14 which is to be magnetized and then through a steel backiron 52 which is a part of the magnetizer. As can be seen from this figure, the lines of flux 54 cross through the magnet 14 in a substantially radially direction resulting in a magnet which when incorporated into a motor will have fairly sharp transition zones. These transition zones are measured as is well know in this field at the zero crossing point of the flux versus position waveform 60 shown in FIG. 2A. As appears at this figure, the angle which is typically measured between the 50% crossing points and thus in the regions 62 which are marked on this graph, are quite sharp. It can be seen that the magnet for the graph of FIG. 2A is for a four-pole motor, and comprising two peaks and two troughs. This constitutes a limitation on the design of this example. Therefore, the objective is to modify the transition angle as measured in the region 62 to make it less sharp or softer, increasing the angle measured at the region 62.

Figure 3B:
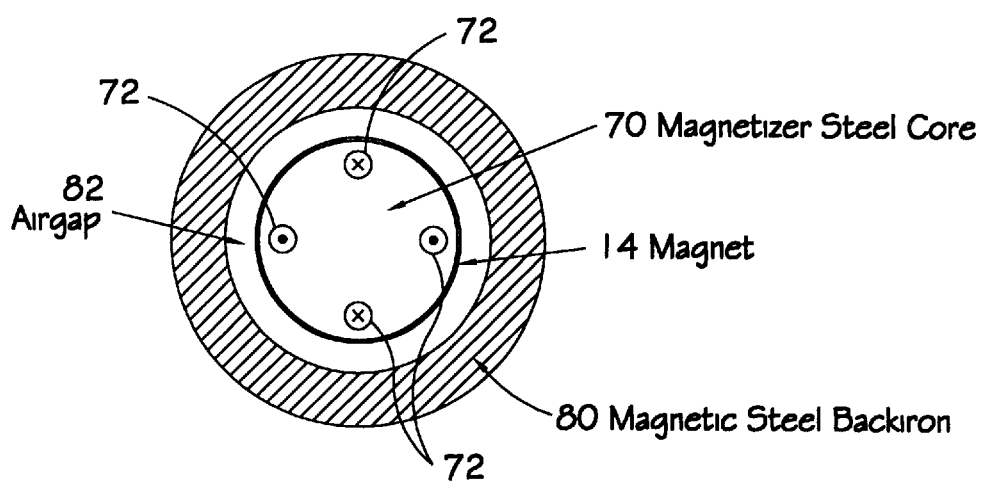
FIG. 3B is a cross-section schematic of a magnetizer useful in explaining this invention.
Figure 3C:
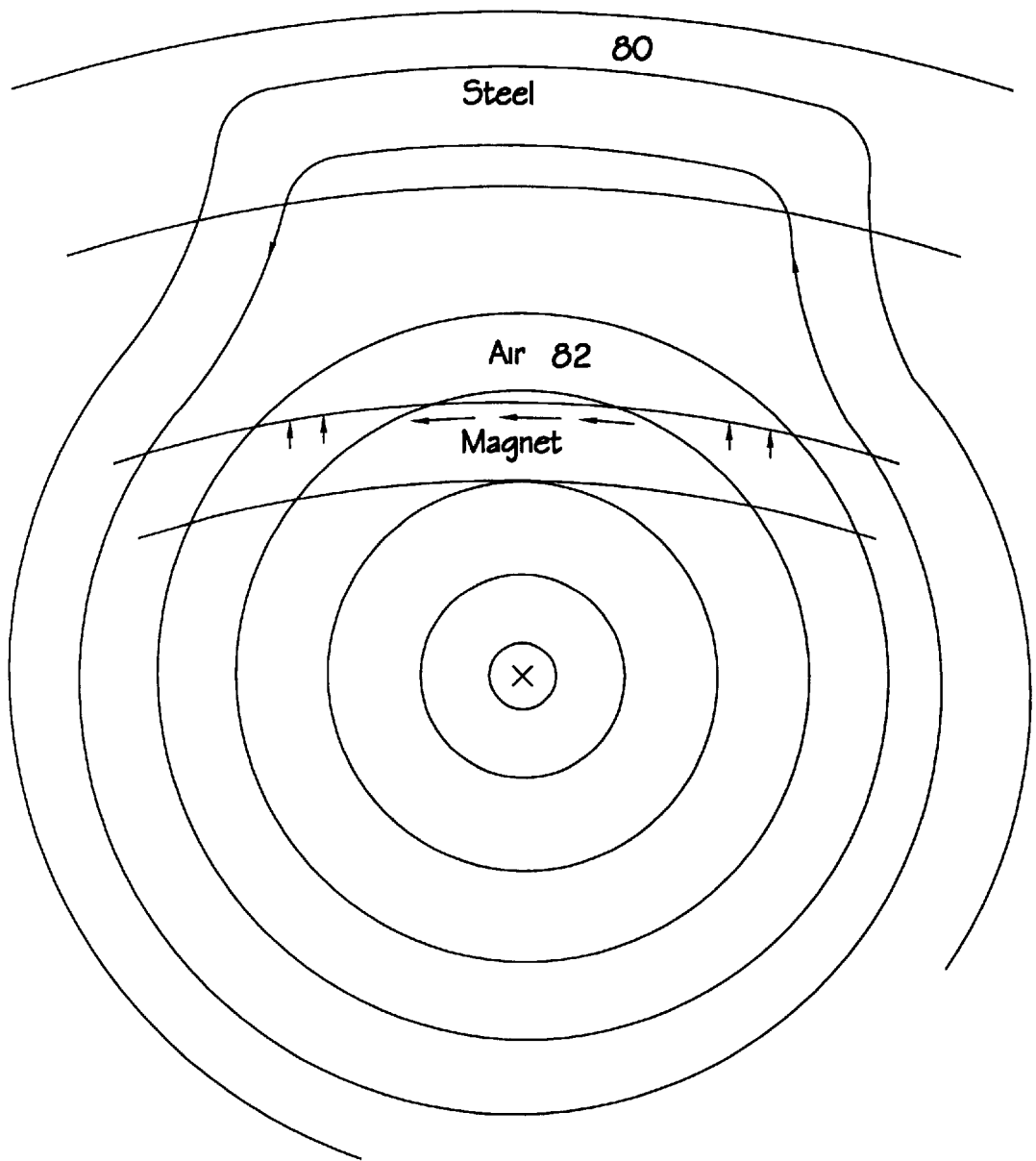
FIG. 3C is a partial section of the magnetizer of FIG. 3B illustrating the effect on flux paths of this invention.

The inventors herein have realized that the transition zone may be widened by modifying the magnetizer so that the flux in the transition zone will tend to form a more circular return path while the magnetizer is operating on the magnet, thereby widening the region in which the flux orientation is tangential or more tangential than in a classically designed magnetizer. The result of this softer transition zone having a greater transition angle as measured between the 50% of peak points will be less vibration in the motor. However, the magnetization process has to also take into account that creating a softer transition angle will also cause a loss of $K_e$ and torque. Purchasers and manufacturers of motors always impose specification on a minimum amount of $K_e$ and torque which must be provided during the motor's operation. Therefore, the process of magnetizing the magnet must also take this limitation into account. Therefore, the present invention modifies the magnetizer which is shown in partial section in FIG. 3A to achieve the design shown in FIG. 3B where an airgap is introduced between the magnet to be magnetized and the magnetic steel backiron. Specifically, FIG. 3B shows a standard magnetizer comprising a magnetizer steel core 70 having a plurality of conductors 72. The conductors 72 are, of course, equal to the number of poles desired for the magnet. The magnet 14 surrounds the conductors, and energization of the conductors creates the necessary patterns of flux lines 54 (see FIG. 3A) to magnetize the magnet. However, in a departure from known practice, the steel backiron 80 which closes the magnetic path is now separated by an airgap 82 from the magnet area. This has the effect shown in FIG. 3C of causing the flux lines which pass through the airgap 82 to remain substantially circular having a highly tangential component and even those which pass through the backiron 80 to be less sharply angled.

Introducing the airgap 82 between the magnet's outer diameter and the steel flux return path backiron 80 results in widening the magnetic flux pole-to-pole transition zone and an increase in the flux transition angle as a function of the width of the airgap. The transition zone between magnet poles is defined as the delineating region in which magnetic flux is oriented tangentially rather than radially.

Figure 4A:
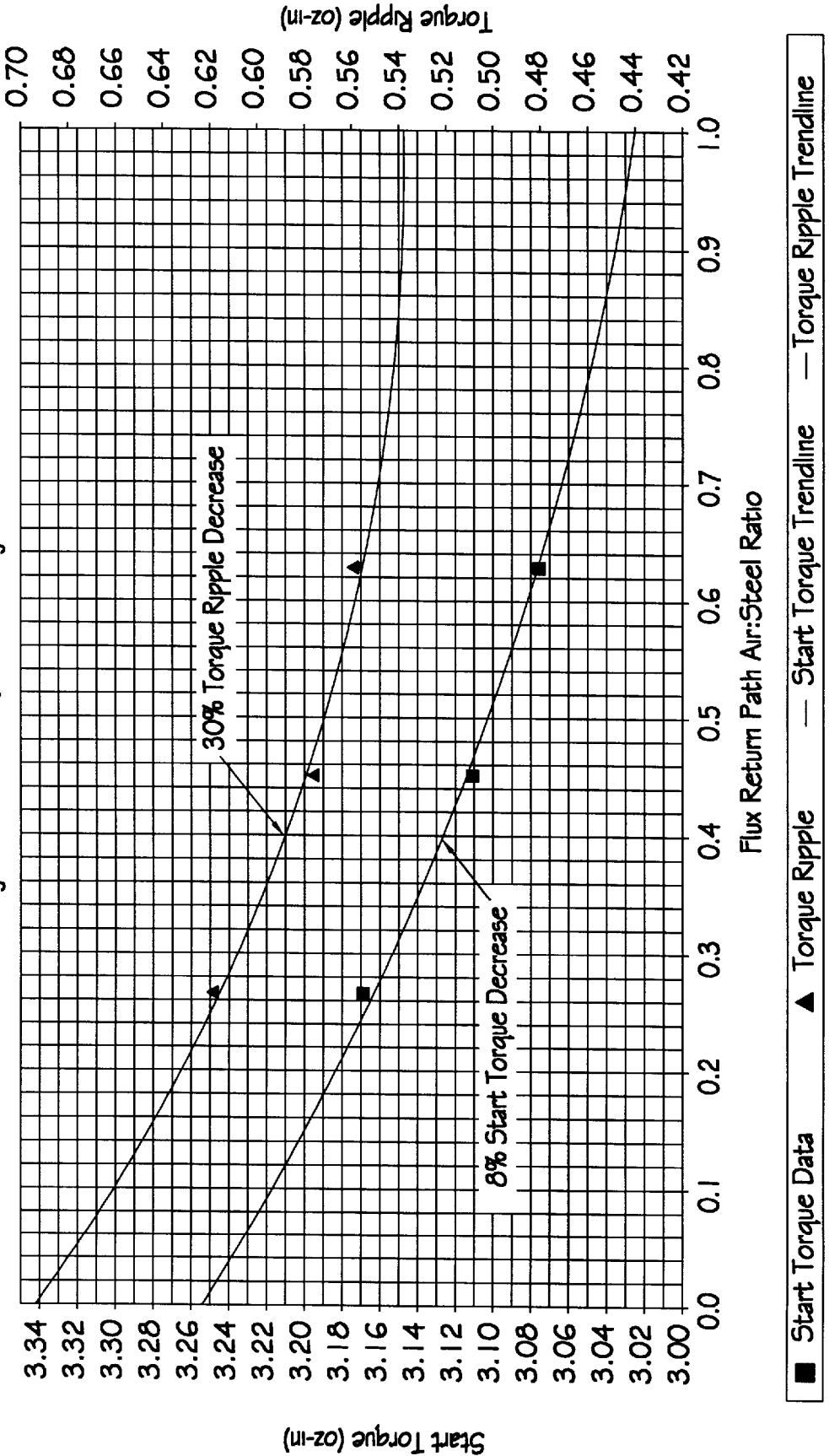
FIGS. 4A and 4B illustrate the effects on torque, transition angle and $K_e$ with changes in the backiron air:steel ratio.
Figure 4B:
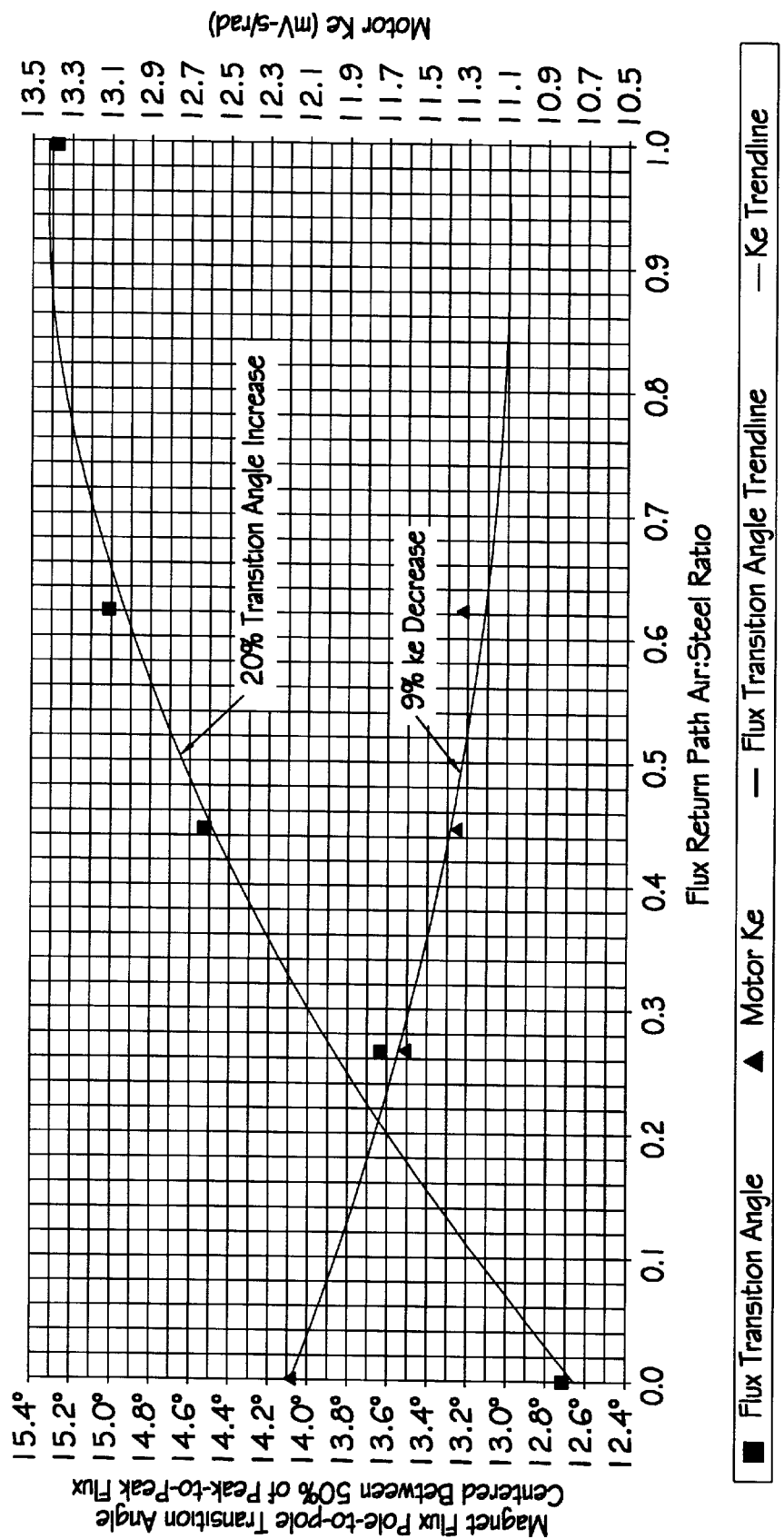

It has been found that the airgap 82 between the magnet's 14 outer diameter and the steel backiron 80 weakens the magnetic flux attraction to the steel return path backiron 80. The flux of the transition zone then tends to form a more circular return path widening the region in which the flux orientation is tangential and widening the transition zone. The closer the steel backiron is to the magnet outer diameter, the closer the flux attraction is to the steel. This strong attraction to the steel backiron 80 aligns the flux more radially in the transition zone, forcing it into a sharply elliptical return path with the result of narrowing the transition zone. It is for this reason, that the width of the transition zone can be carefully selected to decrease the torque ripple (which is desired) as a function of increasing flux transition angle. The measurements of $K_e$ and start torque also decrease (which is not desired); but it has been found that these decrease at one-third the rate in terms of percentage change of the decrease in torque ripple. These results appear graphically in FIGS. 4A and 4B.

Thus, it has been found that widening the flux transition zone essentially softens the magnet pole's defining lines, creating a smoother transition between magnetic poles. The larger the magnetizer backiron airgap, the more significant the softening effect and the lower the start torque and torque ripple at the motor level.

Figure 4C:
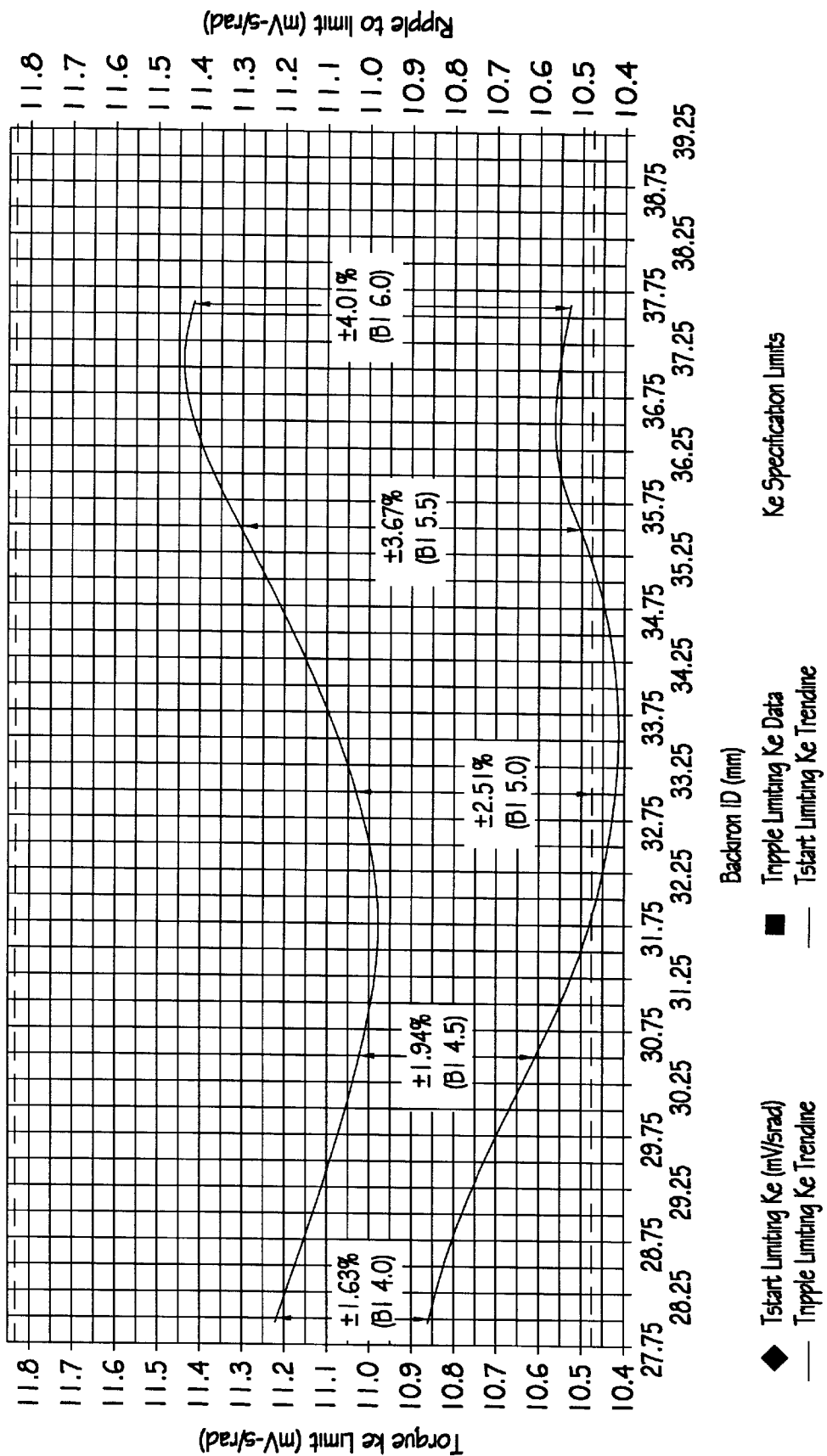

As shown in FIG. 4C, the start torque and torque ripple versus $K_e$ figure illustrates how increasing the backiron airgap size improves torque ripple performance and widens the feasible case of the $K_e$ range. Thus, the present invention of a partially air/partially steel flux return path backiron, and the measurement protocol outlined herein, allows more design flexibility in shaping the magnet flux so that performance optimization may be more finally graduated. In other words, motor performance enhancements based on magnetization changes can now be made with less significant decreases in start torque and $K_e$ than previously possible. The development of Table such as shown in FIG. 5 allow the characterization and development of a finally tuned magnetization process which optimizes the flux transition angle while meeting the specifications imposed by purchasers of the motors incorporating the magnet.

Other features and advantages of the present invention may be apparent to a person of skill in the art who studies the above invention description. Therefore, the scope of the present invention is to be limited only by the following claims.

What is claimed is:

1. A method of magnetizing a permanent magnet for use in a brushless dc spindle motor in a disc drive comprising the steps of:

inserting said magnet in a circular magnetizer comprising a plurality of current carrying wires of alternating polarity extending axially through a steel core, and maintaining a circular backiron surrounding said magnet and separated from said magnet by an airgap, the widths of the airgap and backiron having a known relationship, passing current through said wires to create elliptically shaped flux patterns extending through said magnet and across said airgap to said backiron, and setting said airgap:backiron ratio to establish a transition angle in the magnet.

2. A method as claimed in claim 1 wherein said airgap width is between about 33% and 67% of backiron width.

3. A method as claimed in claim 1 wherein the backiron is steel.

4. A method as claimed in claim 1 wherein the gap is set to optimize the transition angle to improve torque ripple in the motor in which the magnet is to be used.

5. A method as claimed in claim 1 wherein the gap is filled with material with a magnetic permeability similar to air.

6. A method as claimed in claim 5 wherein the magnet is chosen to be cylindrical in shape.

7. A method as claimed in claim 4 wherein the magnet surrounds a central steel core supporting one or more radially extending conductors, the conductors being energized to establish the flux which magnetizes the magnet.

8. A method as claimed in claim 7 wherein the number of conductors is chosen to be equal to the number of poles desired for the magnet.

9. A method as claimed in claim 1 wherein the air gap causes an increase in flux transition angle as a function of the width of the air gap.

* * * * *